US012162273B2

(12) United States Patent
Iijima

(10) Patent No.: US 12,162,273 B2
(45) Date of Patent: Dec. 10, 2024

(54) CASSETTE INCLUDING PRESSURE PORTION FOR SWITCHING ROTATION SPEED OF PLATEN ROLLER UPON ATTACHMENT OF CASSETTE TO PRINTING DEVICE

(71) Applicant: BROTHER KOGYO KABUSHIKI KAISHA, Nagoya (JP)

(72) Inventor: Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 335 days.

(21) Appl. No.: 17/511,309

(22) Filed: Oct. 26, 2021

(65) Prior Publication Data

US 2022/0134784 A1 May 5, 2022

(30) Foreign Application Priority Data

Oct. 30, 2020 (JP) ................................ 2020-182641

(51) Int. Cl.
*B41J 15/04* (2006.01)
*B41J 32/00* (2006.01)

(52) U.S. Cl.
CPC ............ *B41J 15/044* (2013.01); *B41J 32/00* (2013.01)

(58) Field of Classification Search
None
See application file for complete search history.

(56) References Cited

U.S. PATENT DOCUMENTS

| | | | | |
|---|---|---|---|---|
| 4,231,667 A * | 11/1980 | Behrendt | ................. | B41J 33/36 400/208 |
| 4,353,658 A * | 10/1982 | Craft | ........................ | B41J 33/36 400/208 |
| 5,096,315 A | 3/1992 | Yamamoto et al. | | |

(Continued)

FOREIGN PATENT DOCUMENTS

| | | | | |
|---|---|---|---|---|
| EP | 0641663 A2 | 3/1995 | | |
| JP | 60-21289 A * | 2/1985 | ............. | B41J 33/36 |

(Continued)

OTHER PUBLICATIONS

English language translation of JP 60-21289 A to Ikeda et al. publication date Feb. 1985. (Year: 1985).*

(Continued)

*Primary Examiner* — Leslie J Evanisko
(74) *Attorney, Agent, or Firm* — KENEALY VAIDYA LLP

(57) ABSTRACT

A cassette is detachably attachable to a printing device in a first direction, the printing device including a print head, a platen roller, a motor for generating a driving force to rotate the platen roller, and a power transmission portion for transmitting the driving force to the platen roller. The cassette includes a printing tape, a casing accommodating the printing tape, and a pressure portion. Upon attachment of the cassette to a cassette receiving portion of the printing device, the pressure portion is configured to move a specific gear of the power transmission portion in the first direction to allow the power transmission portion to mechanically switch a ratio of a rotation number of the platen roller to a rotation number of the motor in accordance with a position of the specific gear in the first direction.

6 Claims, 10 Drawing Sheets

(56) References Cited

U.S. PATENT DOCUMENTS

| | | | |
|---|---|---|---|
| 2006/0233582 | A1 | 10/2006 | Horiuchi |
| 2022/0134784 | A1 | 5/2022 | Iijima |

FOREIGN PATENT DOCUMENTS

| | | | |
|---|---|---|---|
| JP | H02-112462 | U | 9/1990 |
| JP | H06-336068 | A | 12/1994 |
| JP | 2002-370411 | A | 12/2002 |
| JP | 2009255307 | A | 11/2009 |
| WO | 2009084415 | A1 | 7/2009 |

OTHER PUBLICATIONS

Extended European Search Report for the related European Patent Application No. 21204379.8 dated Mar. 2, 2022.
Non-Final Office Action issued Nov. 2, 2022 to U.S. Appl. No. 17/511,259.
Final Office Action issued Mar. 14, 2023 to U.S. Appl. No. 17/511,259.
Non-Final Office Action issued Jun. 23, 2023 to U.S. Appl. No. 17/511,259.
Non-Final Office Action issued Dec. 1, 2023 to U.S. Appl. No. 17/511,259.
Japanese Office Action for the related Japanese Patent Application No. 2020-182641 dated May 14, 2024.

* cited by examiner

CASSETTE INCLUDING PRESSURE PORTION FOR SWITCHING ROTATION SPEED OF PLATEN ROLLER UPON ATTACHMENT OF CASSETTE TO PRINTING DEVICE

CROSS REFERENCE TO RELATED APPLICATION

This application claims priority from Japanese Patent Application No. 2020-182641 filed Oct. 30, 2020. The entire content of the priority application is incorporated herein by reference.

BACKGROUND

There has been known a printing device configured to perform printing on a printing tape that was accommodated in a cassette detachably attached to the printing device. For example, a prior art discloses such a conventional printing device that includes: a platen roller; a motor; a transmission mechanism configured to transmit a driving force of the motor to the platen roller; and a switching mechanism. The switching mechanism is configured to switch the power transmission path of the transmission mechanism in accordance with the rotational direction of the motor (forward or reverse) to thus change over a rotation speed of the platen roller. In this printing device, the rotational direction of the motor is controlled such that the rotation speed of the platen roller is to be lower for two-color printing than for monochromatic printing.

SUMMARY

However, in the above conventional printing device, an operation for origin confirmation of the motor is required each time the rotation speed of the motor is to be switched prior to start of printing. Hence, the timing to start printing is delayed by the period to perform the operation for origin confirmation.

In view of the foregoing, it is an object of the disclosure to provide a cassette that enables a printing device to start printing in a shorter period of time when the printing device performs switching of the rotation speed of the platen roller.

In order to attain the above and other objects, according to one aspect, the disclosure provides a cassette detachably attachable to a printing device including: a print head; a platen roller; a motor for generating a driving force to rotate the platen roller; a cassette receiving portion; and a power transmission portion for transmitting the driving force to the platen roller and including a specific gear. The cassette is attached to the cassette receiving portion in a first direction. The cassette includes a printing tape, a casing and a pressure portion. The printing tape is to be printed by the print head and conveyed by the platen roller. The casing accommodates the printing tape. The pressure portion is configured to move the specific gear in the first direction upon attachment of the cassette to the cassette receiving portion to allow the power transmission portion to mechanically switch a ratio of a rotation number of the platen roller to a rotation number of the motor in accordance with a position of the specific gear in the first direction.

With this structure of the cassette, the pressure portion can move the first gear of the printing device from the first position to the second position in the first direction upon attachment of the cassette to the printing device, to realize switching of the rotation speed of the platen roller. Accordingly, for the printing device to which the cassette is attachable, there is no need to perform an operation for origin confirmation in order to switch the rotation speed of the motor. The cassette can allow the printing device to start printing in a shorter period of time when switching of the rotation speed of the platen roller is performed.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

1. First Embodiment

A printing device 1 to which a cassette 6 according to a first embodiment of the present disclosure is detachably attachable will be described with reference to FIGS. 1A through 8.

Throughout the description, terms such as "front", "rear", "right", "left", "above", "below" will be used throughout the description based on an orientation of the printing device 1 illustrated in FIG. 1A. That is, a diagonal lower left side in FIG. 1A will be referred to as "left side", a diagonal upper right side in FIG. 1A will be referred to as "right side", a diagonal lower right side in FIG. 1A will be referred to as "front side", and a diagonal upper left side in FIG. 1A will be referred to as "rear side" of the printing device 1 (also see arrows illustrated in each drawing). Further, each component in the attached drawings is not to scale and illustrated as an example to facilitate understanding of the disclosure.

The printing device 1 is a tape printer of a universal type to which various types of cassettes such as a heat-sensitive type cassette, a receptor type cassette, and a laminate type cassette are each selectively attachable. The cassette of heat sensitive type includes a heat sensitive tape. The cassette of receptor type includes a printing tape, and an ink ribbon. The cassette of laminate type includes a double-sided adhesive tape, a film tape, and an ink ribbon.

The printing device 1 includes a print head 15 (FIG. 3) described later to perform printing on a printing medium. The printing medium to be printed by the print head 15 of the printing device 1 will be collectively referred to as "printing tape", hereinafter. That is, the printing tape may include: the heat-sensitive tape of the heat sensitive type cassette; the printing tape of the receptor type cassette; and the film tape of the laminate type cassette. For simplifying description, in the present embodiment, a cassette 6 of the heat-sensitive type is assumed to be attached to the printing device 1.

<Printing Device 1>

Figure 1A:
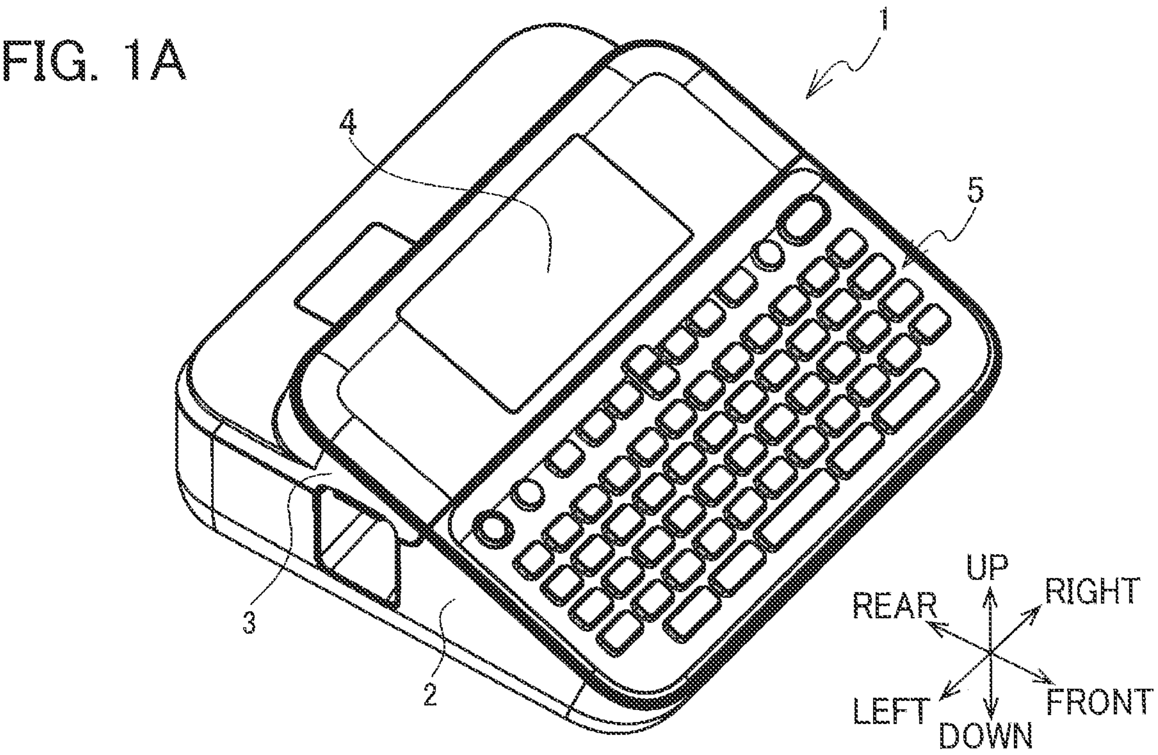
FIG. 1A is a perspective view of a printing device 1 according to a first embodiment of the disclosure in a state where a cover 3 thereof is closed.
Figure 1B:
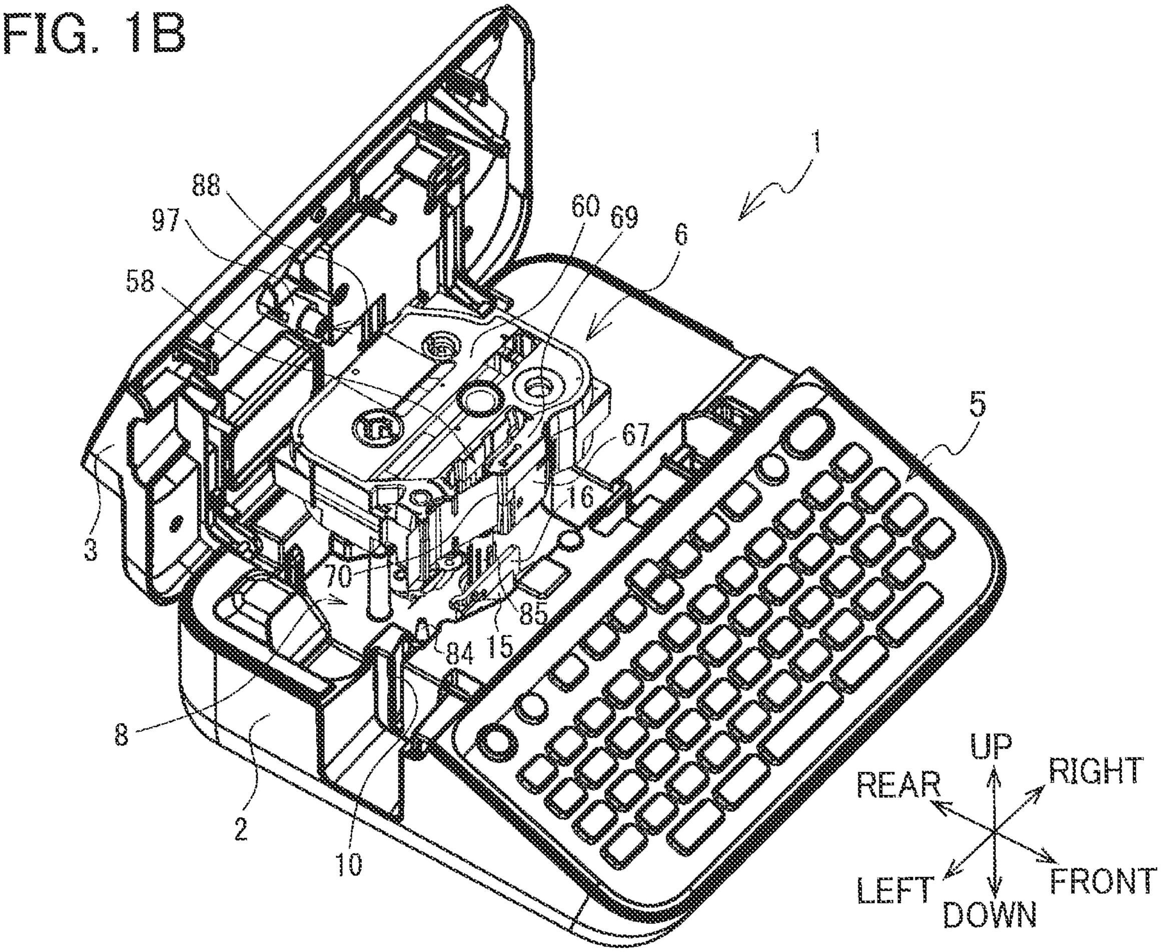
FIG. 1B is a perspective view of the printing device 1 according to the first embodiment in a state where the cover 3 is opened.

As illustrated in FIGS. 1A and 1B, the printing device 1 includes a housing 2, a cover 3, a display 4, and an operating portion 5.

The housing 2 has a generally rectangular parallelepiped shape. The housing 2 has a left side surface where an ejection slit 10 is formed. The ejection slit 10 is an opening extending in an upward/downward direction. The ejection slit 10 is configured to discharge therethrough a tape M (see FIG. 6) out of a cassette receiving portion 8 on which the cassette 6 is mounted.

The cover 3 is pivotally movably supported by a rear end portion of the housing 2 so as to be pivotable about an axis extending in a leftward/rightward direction. FIG. 1A illustrates a state where the cover 3 is closed relative to the housing 2, and FIG. 1B illustrates a state where the cover 3 is opened relative to the housing 2. The cover 3 is opened and closed, for example, when the cassette 6 is to be replaced with a new cassette. In the following description, description will be made assuming that the cover 3 is closed relative to the housing 2, i.e., based on the posture of the printing device 1 illustrated in FIG. 1A.

Figure 7:
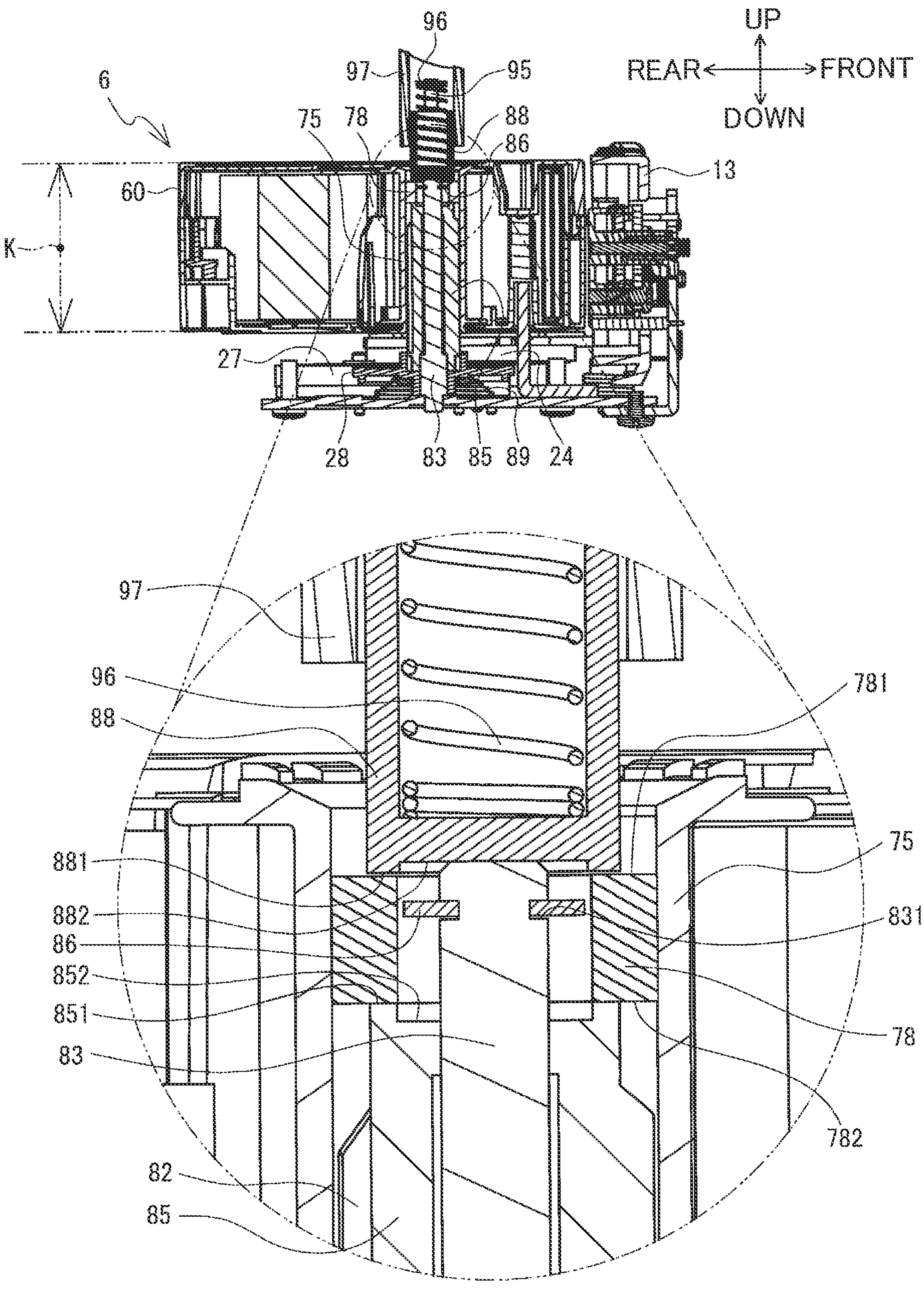
FIG. 7 is a cross-sectional view of the cassette 6 mounted on the cassette receiving portion 8 taken along a line VII-VII of FIG. 5, and particularly illustrating the cassette 6 including a pressure portion 78.

The cover 3 has a lower surface at which a pressure member 88, a support rod 95, an urging member 96, and a sleeve portion 97 are provided (see FIGS. 1B and 7). The pressure member 88 is hollow cylindrical in shape with a closed bottom and extends in the upward/downward direction. The pressure member 88 is configured to press the cassette 6 downward in a state where the cassette 6 is attached to the cassette receiving portion 8. The pressure member 88 has an upper end portion connected to the support rod 95.

The urging member 96 such as a coil spring is disposed over the support rod 95 and inside the hollow space of the pressure member 88. Specifically, the urging member 96 has an upper end connected to an upper end of the support rod 95. The urging member 96 (more specifically, a lower end of the urging member 96) is in abutment with the pressure member 88 to urge the pressure member 88 downward. The sleeve portion 97 is hollow cylindrical in shape and extends in the upward/downward direction. The upper end portion of the pressure member 88 is inserted in the hollow space of the sleeve portion 97, such that the sleeve portion 97 guides movement of the pressure member 88 in the upward/downward direction.

Although not illustrated in the drawings, the pressure member 88 has an upper rear outer peripheral portion provided with a protrusion, and the sleeve portion 97 is formed with a groove (not illustrated) extending in the upward/downward direction. The protrusion of the pressure member 88 is engaged with the groove of the sleeve portion 97, thereby regulating a movable range of the pressure member 88 in the upward/downward direction.

As illustrated in FIG. 1A, the display 4 is provided on an upper surface of the cover 3. The display 4 is, for example, a liquid crystal display configured to display various information. The operating portion 5 is provided on an upper surface of the housing 2 and is positioned frontward of the cover 3. The operating portion 5 is configured to be operated by a user to input various instructions.

Figure 2:
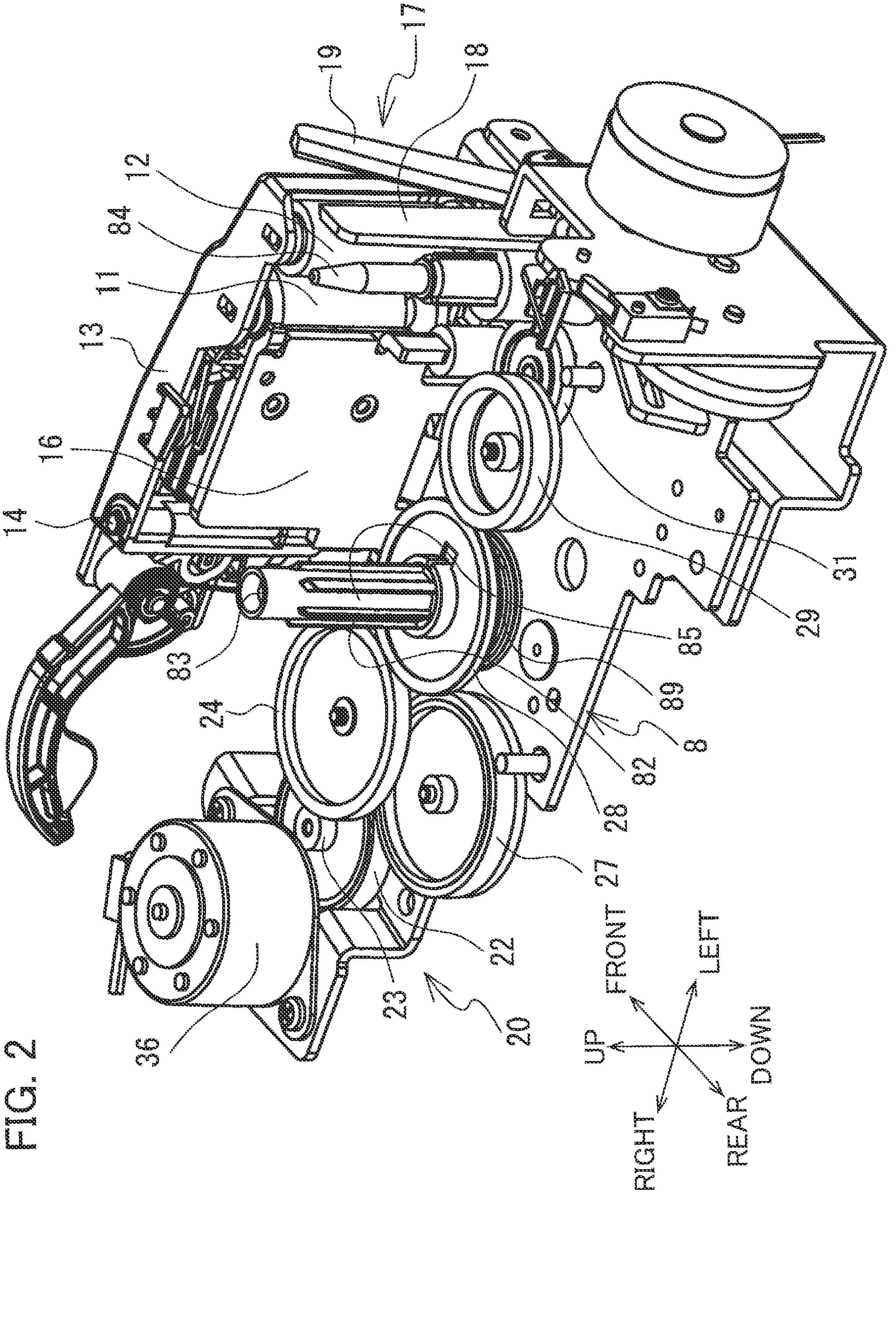
FIG. 2 is a perspective view illustrating a cassette receiving portion 8, a motor 36, and a power transmission portion 20 in the printing device 1 according to the first embodiment, in which delineation of a bottom surface of the cassette receiving portion 8 is omitted.
Figure 3:
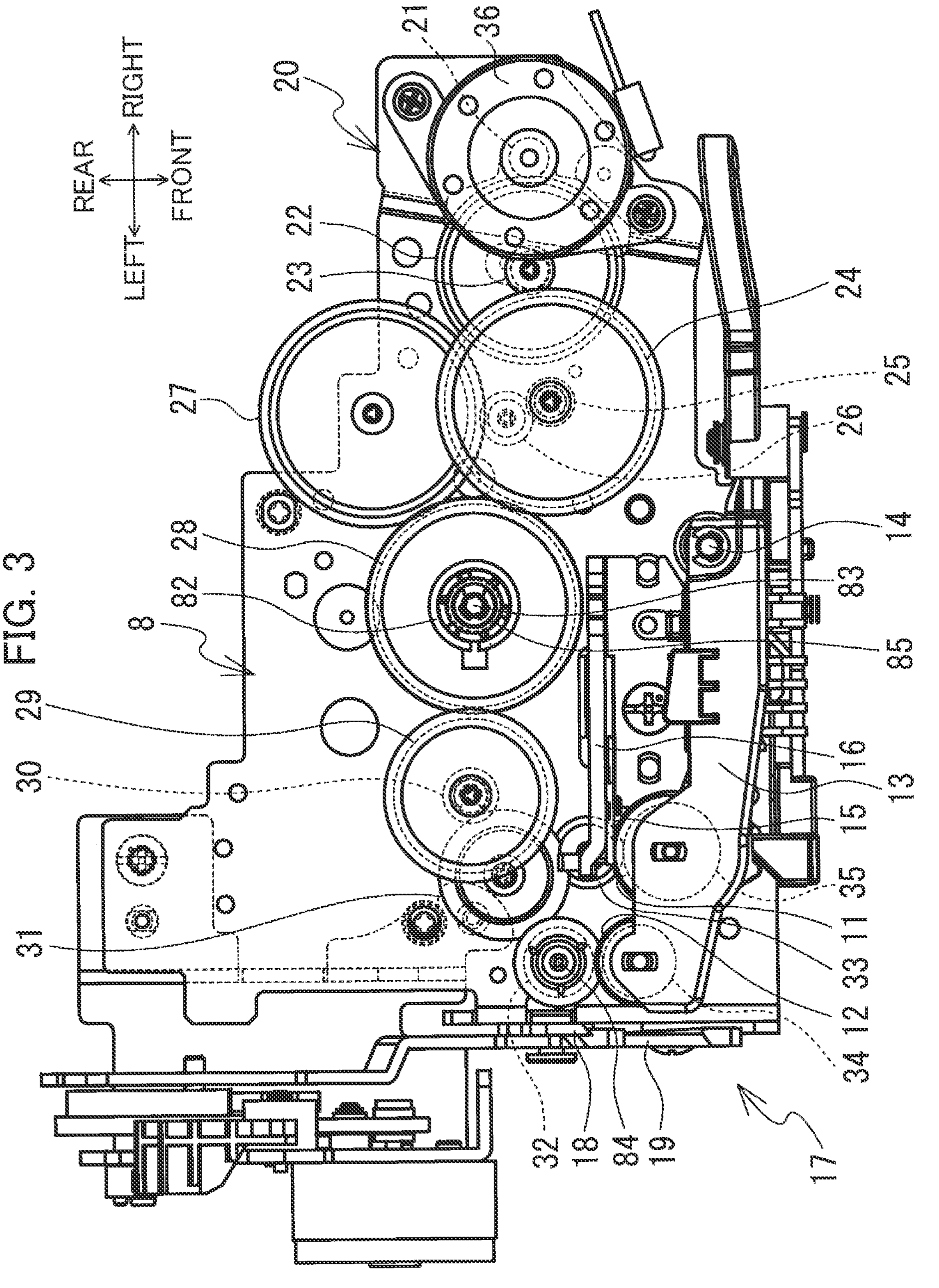
FIG. 3 is a plan view illustrating the cassette receiving portion 8, the motor 36, and the power transmission portion 20 in the printing device 1 according to the first embodiment.
Figure 4:
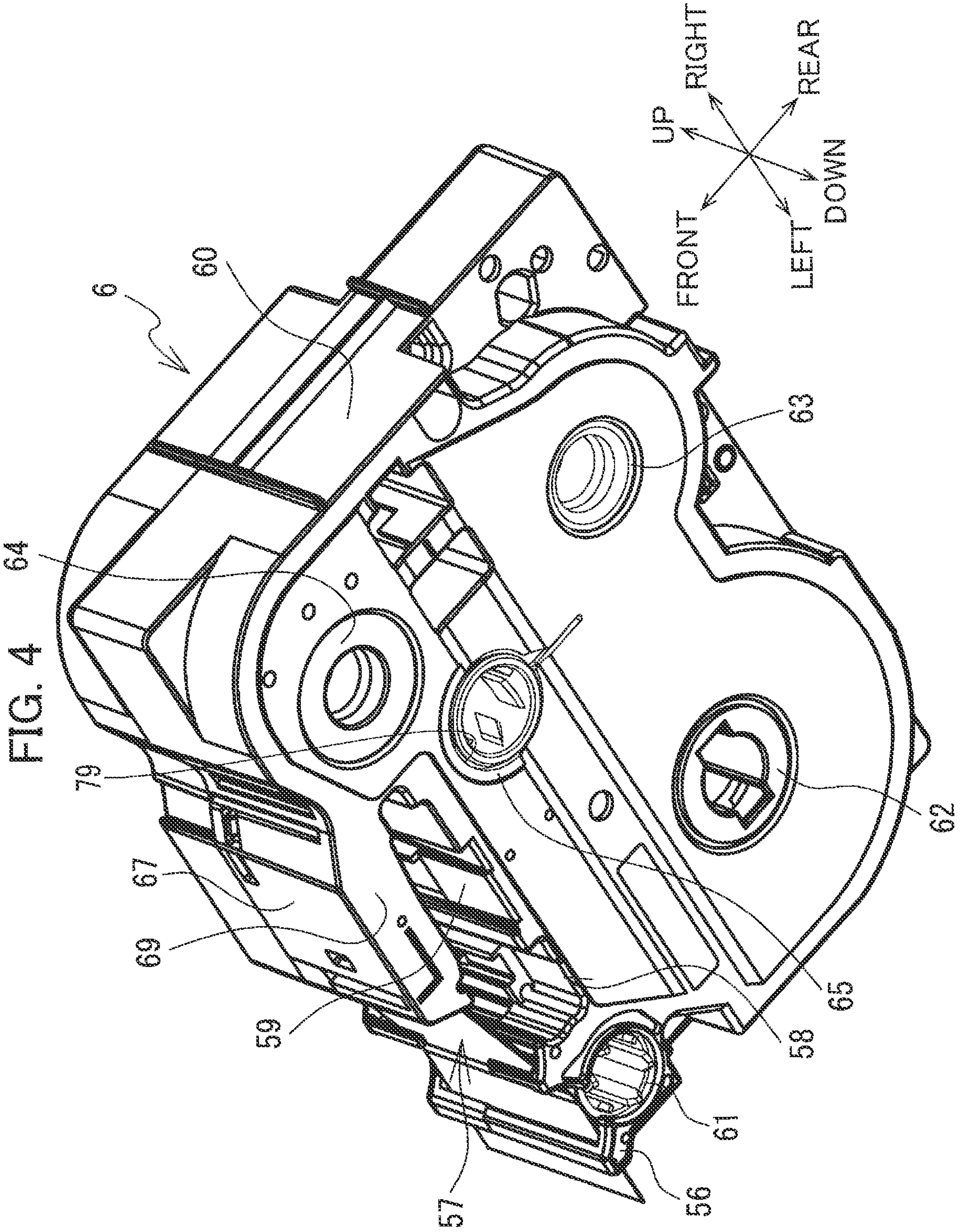
FIG. 4 is a perspective view of a cassette 6 to be used with the printing device 1 according to the first embodiment.

As illustrated in FIGS. 1B, 2 and 3, the printing device 1 includes the cassette receiving portion 8, drive shafts 83, 84, a movable member 85, a head holder 16, the print head 15, a platen holder 13, a platen roller 11, a movable conveyer roller 12, a motor 36, a power transmission portion 20, an urging member 89, and a cutter mechanism 17. All these parts are provided in a space surrounded by the housing 2 and the closed cover 3.

The cassette receiving portion 8 is in a recessed form recessed downward for detachably receiving the cassette 6 thereon. The cassette 6 is of the heat sensitive type and thus accommodates therein a heat-sensitive tape 51 (FIG. 6) as the printing tape to be printed by the print head 15. The drive shafts 83, 84 and the movable member 85 are provided at the cassette receiving portion 8.

The drive shafts 83 and 84 respectively extend in the upward/downward direction. The drive shaft 83 is positioned rearward of a right end portion of the head holder 16, and the drive shaft 84 is positioned leftward of the head holder 16. To the drive shaft 83, a first gear 28 (described later) of the power transmission portion 20 is coupled coaxially, so that the drive shaft 83 is rotatable in accordance with the rotation of the first gear 28.

The movable member 85 is provided at the cassette receiving portion 8, and is movable in the upward/downward direction with respect to the drive shaft 83. Specifically, the movable member 85 is disposed over the drive shaft 83 so as to be movable in the upward/downward direction relative to the drive shaft 83. The movable member 85 is disposed over the drive shaft 83 at a position above the first gear 28 provided adjacent to a lower end of the drive shaft 83. The movable member 85 has a lower end in abutment with an upper surface of the first gear 28.

A plurality of ribs 82 is provided on outer peripheral surface of the movable member 85. The ribs 82 are arranged radially about an axis of the movable member 85 extending in the upward/downward direction with an equal interval between neighboring ribs. The plurality of ribs 82 protrude radially outwardly from the outer peripheral surface of the movable member 85, and extend downward from a position adjacent to the upper end of the movable member 85. The movable member 85 is configured to be rotated by the rotation of the drive shaft 83.

The urging member 89 is disposed over the drive shaft 83 at a position below the first gear 28. The urging member 89 urges the first gear 28 upward. The movable member 85 is urged upward by the urging member 89 through the first gear 28.

As illustrated in FIG. 7, an upper end portion of the drive shaft 83 is formed with an annular groove 831 recessed toward the axis of the drive shaft 83, and a ring 86 is fitted in the annular groove 831. The ring 86 has an outer peripheral surface positioned further radially outwardly relative to the outer peripheral surface of the drive shaft 83. The movable member 85 has an upper end 851 formed with an annular recessed portion 852 recessed downward. The ring 86 protruding radially outward from the drive shaft 83 is configured to come into contact with the annular recessed portion 852, thereby restricting further upward movement of the movable member 85.

The drive shaft 84 is coaxial with a gear 32 (described later, FIG. 3) of the power transmission portion 20, and is rotatable by the rotation of the gear 32. Upon attachment of the cassette 6 to the cassette receiving portion 8, the drive shaft 83 is inserted in a spool 75 (described later, FIG. 6) of the cassette 6 to rotate the spool 75 in accordance with rotations of the motor 36; and the drive shaft 84 is inserted in a tape conveyer roller 71 (described later, FIG. 6) of the cassette 6 to rotate the tape conveyer roller 71 in accordance with the rotations of the motor 36.

The first gear 28, the movable member 85, and the urging member 89 are disposed over the drive shaft 83. The first gear 28 and the urging member 89 are arranged below a bottom wall (not illustrated) of the cassette receiving portion 8. The bottom wall is formed with two circular holes in a plan view. The drive shaft 83 and the movable member 85 disposed thereover are inserted through one of the circular holes. The drive shaft 84 is inserted through the other one of the circular holes.

The head holder 16 is positioned at a front portion of the cassette receiving portion 8. The head holder 16 is plate shaped and made from metal. The head holder 16 has a front surface equipped with the print head 15. The print head 15 includes a plurality of heat generating elements configured to heat the heat-sensitive tape 51 provided in the cassette 6 for printing. The head holder 16 is inserted in a head opening 58 (described later, FIG. 6) of the cassette 6 upon attachment of the cassette 6 to the cassette receiving portion 8.

Incidentally, in a case where the cassette 6 is either of the receptor type or the laminate type, the plurality of heat generating elements of the print head 15 is configured to heat the ink ribbon provided in the cassette 6 for printing. The rotation of the drive shaft 83 is used for winding the ink ribbon after printing by the print head 15.

The motor 36 is positioned rightward of the cassette receiving portion 8. The motor 36 includes a motor body and an output shaft extending downward from the motor body. A stepping motor is one example of the motor 36.

The power transmission portion 20 includes a plurality of gears 21 through 35 including the first gear 28 and the gears 31, 32 described above. The power transmission portion 20 illustrated in FIGS. 2 and 3 are hidden from sight with the bottom wall of the cassette receiving portion 8. In FIGS. 2, 3 and 7, delineation of gear teeth of the gears 21-35 is omitted.

The first gear 28 is movable from a first position to a second position lower than the first position. Specifically, the first gear 28 is movable from the first position to the second position in interlocking relation to the downward movement of the movable member 85. The power transmission portion 20 is configured to changeover a ratio of the rotation number of the platen roller 11 to the rotation number of the motor 36 dependent on whether the first gear 28 is at the first position or the second position when transmitting the driving force of the motor 36 to the platen roller 11.

More specifically, in the power transmission portion 20, the gear 21 is fixed to a lower end portion of the output shaft of the motor 36. The gear 21 is in meshing engagement with a gear 22 positioned leftward of the gear 21. The gear 22 is coaxial with a gear 23 constituting a cluster gear in combination of the gear 22. The gear 23 has a diameter smaller than that of the gear 22, and has gear teeth whose number is smaller than that of the gear 22. The gear 23 is positioned above the gear 22.

The gear 23 is in meshing engagement with a second gear 24 positioned leftward of the gear 23. The second gear 24 is coaxial with a gear 25 constituting a cluster gear in combination of the second gear 24. The gear 25 has a diameter smaller than that of the second gear 24, and has gear teeth whose number is smaller than that of the second gear 24. The gear 25 is positioned below the second gear 24. The gear 25 is in meshing engagement with a gear 26 positioned diagonally leftward and rearward of the gear 25. The gear 26 has a diameter slightly greater than a diameter of the gear 25.

The gear 26 is in meshing engagement with a third gear 27 positioned rearward of the gear 26. The third gear 27 has a diameter greater than the diameter of the gear 26. The third gear 27 has a front end portion positioned below a rear end portion of the second gear 24. That is, the front end portion of the third gear 27 and the rear end portion of the second gear 24 are overlapped with each other in the upward/downward direction.

The first gear 28 is configured to be meshingly engaged with the second gear 24 when the first gear 28 is at the first position, while the first gear 28 is configured to be meshingly engaged with the third gear 27 when the first gear 28 is at the second position. The first gear 28 is meshingly engaged with a gear 29 positioned leftward of the first gear 28, regardless of whether the first gear 28 is at the first position or the second position. As one example, a rotation ratio of the first gear 28 at the second position is one fifth of the rotation ratio of the first gear 28 at the first position. Incidentally, the rotation ratio of the motor 36 to the platen roller 11 when the first gear 28 is at the first position and the second position may be appropriately altered.

The gear 29 is coaxial with a gear 30 constituting a cluster gear in combination of the gear 29. The gear 30 has a diameter smaller than that of the gear 29, and has gear teeth whose number is smaller than that of the gear 29. The gear 30 is positioned below the gear 29. The gear 30 is in meshing engagement with the gear 31 positioned diagonally leftward and frontward of the gear 30. The gear 31 is in meshing engagement with the gear 32 positioned diagonally leftward and frontward of the gear 31.

The gear 32 is configured to be meshingly engaged with the gear 34 positioned frontward of the gear 32 when the platen holder 13 is at a printing position described later. The gear 31 is also in meshing engagement with the gear 33 positioned diagonally rightward and frontward of the gear 31. The gear 33 is configured to be meshingly engaged with the gear 35 positioned frontward of the gear 33 when the platen holder 13 is at the printing position.

In the state where the cassette 6 is attached to the cassette receiving portion 8, the rotation of the motor 36 in a counterclockwise direction causes a rotation of the drive shaft 83 in the counterclockwise direction in a plan view. The rotation of the drive shaft 83 rotates the spool 75 attached to the drive shaft 83. The rotation of the motor 36 is transmitted to the drive shaft 84 to rotate the tape conveyer roller 71 attached to the drive shaft 84 in a clockwise direction in a plan view. The rotation of the motor 36 is also transmitted to the gears 34 and 35 to rotate the movable conveyer roller 12 and the platen roller 11, respectively, in the counterclockwise direction in a plan view.

The platen holder 13 has an arm-like shape, and is positioned frontward of the head holder 16. The platen holder 13 is pivotally movable about an axis of a shaft 14 extending in the upward/downward direction and provided at a right end portion of the platen holder 13. The platen roller 11 and the movable conveyer roller 12 are supported at a left end portion of the platen holder 13 such that the platen roller 11 and movable conveyer roller 12 are rotatable about axes extending in the upward/downward direction.

Specifically, the platen holder 13 is pivotally movable between a standby position (illustrated by phantom lines in FIG. 6) and the printing position (illustrated by solid lines in FIG. 6) in interlocking relation to the opening/closing movement of the cover 3. The platen holder 13 at the printing position is positioned adjacent to the cassette receiving portion 8. The platen holder 13 at the standby position is positioned apart from the cassette receiving portion 8. The platen holder 13 is moved from the printing position to the standby position in association with the opening movement of the cover 3. The cassette 6 is attachable to and detachable from the cassette receiving portion 8 by a user when the platen holder 13 is at the standby position.

At the printing position of the platen holder 13, the platen roller 11 faces the print head 15 and in contact therewith. The platen roller 11 is thus configured to make contact with and separate from the print head 15 in accordance with the pivotal movement of the platen holder 13. Likewise, the movable conveyer roller 12 faces the tape conveyer roller 71 attached to the drive shaft 84 when the platen holder 13 is at the printing position. The movable conveyer roller 12 is configured to make contact with and separate from the tape conveyer roller 71 attached to the drive shaft 84 in accordance with the pivotal movement of the platen holder 13.

The platen holder 13 is moved from the standby position to the printing position in association with the closing movement of the cover 3. In the attached state of the cassette 6 to the cassette receiving portion 8 (and hence when the platen holder 13 is at the printing position), the platen roller 11 is pressed against the print head 15 through the printing tape (heat-sensitive tape 51), and the movable conveyer roller 12 is pressed against the tape conveyer roller 71 through the printing tape (heat-sensitive tape 51) and an adhesive tape 52 (described later) of the cassette 6.

Further, when the platen holder 13 is at the printing position, the gear 32 is meshingly engaged with the gear 34, and the gear 33 is meshingly engaged with the gear 35. Hence, the platen roller 11 and the movable conveyer roller 12 are respectively rotated by the rotation of the motor 36. A rotation speed of the platen roller 11 is switchable depending on the upward/downward direction position (first position or second position) of the first gear 28 of the power transmission portion 20. The printing device 1 can perform printing using the cassette 6 attached to the cassette receiving portion 8 when the platen holder 13 is at the printing position.

The cutter mechanism 17 is positioned leftward of the cassette receiving portion 8 and rightward of the ejection slit 10. The cutter mechanism 17 is configured to cut the tape M (see FIG. 6) discharged out of the cassette 6 attached to the cassette receiving portion 8 at a predetermined position. The cutter mechanism 17 includes a fixed blade 18 and a movable blade 19 those made from metal. The movable blade 19 is positioned to face the fixed blade 18, and is movable relative to the fixed blade 18.

<Cassette 6>

The cassette 6 will next be described with reference to FIGS. 4 through 8.

The cassette 6 includes a casing 60. Depending on the kinds of the printing tape accommodated in the casing 60, the cassette 6 can be one of: a heat-sensitive type cassette, a laminate type cassette, and a receptor type cassette. In other words, the cassette 6 is of universal type. In the first embodiment, the cassette 6 of the heat-sensitive type is described as an example of a cassette of the disclosure.

In addition to the casing 60, the cassette 6 further includes support portions 61-65, the tape conveyer roller 71, spools 71-75, the heat-sensitive tape 51, and the adhesive tape 52. In a case where the heat-sensitive tape 51 is of a color heat-sensitive type to be used for color printing, the cassette 6 further includes a pressure portion 78 (FIG. 7). On the other hand, in a case where the heat-sensitive tape 51 is of a monochromatic heat-sensitive type to be used for monochromatic printing, the pressure portion 78 is not provided.

The casing 60 has a generally rectangular parallelepiped shape (or a box-like shape) with rounded corners in a plan view. The casing 60 includes an arm portion 69, an ejection opening 70, a head peripheral wall 59, and a guide portion 56.

The arm portion 69 extends leftward from a right front portion of the casing 60. The arm portion 69 is defined by an arm front wall 67 and an arm rear wall 68. The arm front wall 67 constitutes a part of a front wall of the casing 60. The arm front wall 67 extends in the upward/downward direction and in the leftward/rightward direction across a left-right center of the front wall of the casing 60. The arm rear wall 68 is positioned rearward of the arm front wall 67 to be spaced away therefrom. The arm rear wall 68 extends in the leftward/rightward direction and the upward/downward direction.

The ejection opening 70 is formed at a left end portion of the arm portion 69. The ejection opening 70 is a slit extending in the upward/downward direction and positioned between the arm front wall 67 and the arm rear wall 68 in the frontward/rearward direction.

The head peripheral wall 59 extends rearward from a right end of the arm rear wall 68 and then extends leftward in parallel to the arm rear wall 68. The head peripheral wall 59 and the arm rear wall 68 define the head opening 58 therebetween. That is, the head opening 58 is positioned rearward of and adjacent to the arm portion 69. The head opening 58 has a substantially rectangular shape in a plan view and extends throughout a thickness of the casing 60 in the upward/downward direction. The head opening 58 also extends in the leftward/rightward direction across a left-right center of the casing 60.

Upon attachment of the cassette 6 to the cassette receiving portion 8 of the printing device 1, the head holder 16 of the cassette receiving portion 8 is inserted in the head opening 58. The head opening 58 is communicated with an outside of the cassette 6 at a front side thereof through an open portion 57 (see FIG. 4) formed in the front wall of the casing 60. The heat-sensitive tape 51 accommodated in the casing 60 is ejected out of the arm portion 69 through the ejection opening 70, and is exposed to the outside at the open portion 57 where the print head 15 performs printing on the heat-sensitive tape 51.

The guide portion 56 is positioned at a left front corner of the casing 60. The guide portion 56 is configured to guide the tape M (the printed heat-sensitive tape 51 on which the adhesive tape 52 is superposed) toward the cutter mechanism 17, while the tape M passes through the guide portion 56.

The support portion 61 is positioned at a left front end portion of the casing 60 and rotatably supports the tape conveyer roller 71. The support portion 62 is positioned at a left rear end portion of the casing 60 and rotatably supports the spool 72. The support portion 63 is positioned at a right rear end portion of the casing 60 and rotatably supports the spool 73. The support portion 64 is positioned at a right front end portion of the casing 60 and rotatably supports the spool 74. The support portion 65 is positioned between the support portion 61 and the support portion 64 in the leftward/rightward direction. The support portion 65 is positioned forward of the support portions 63 and 64 and rearward of the support portions 61 and 64. The support portion 65 rotatably supports the spool 75.

Figure 6:
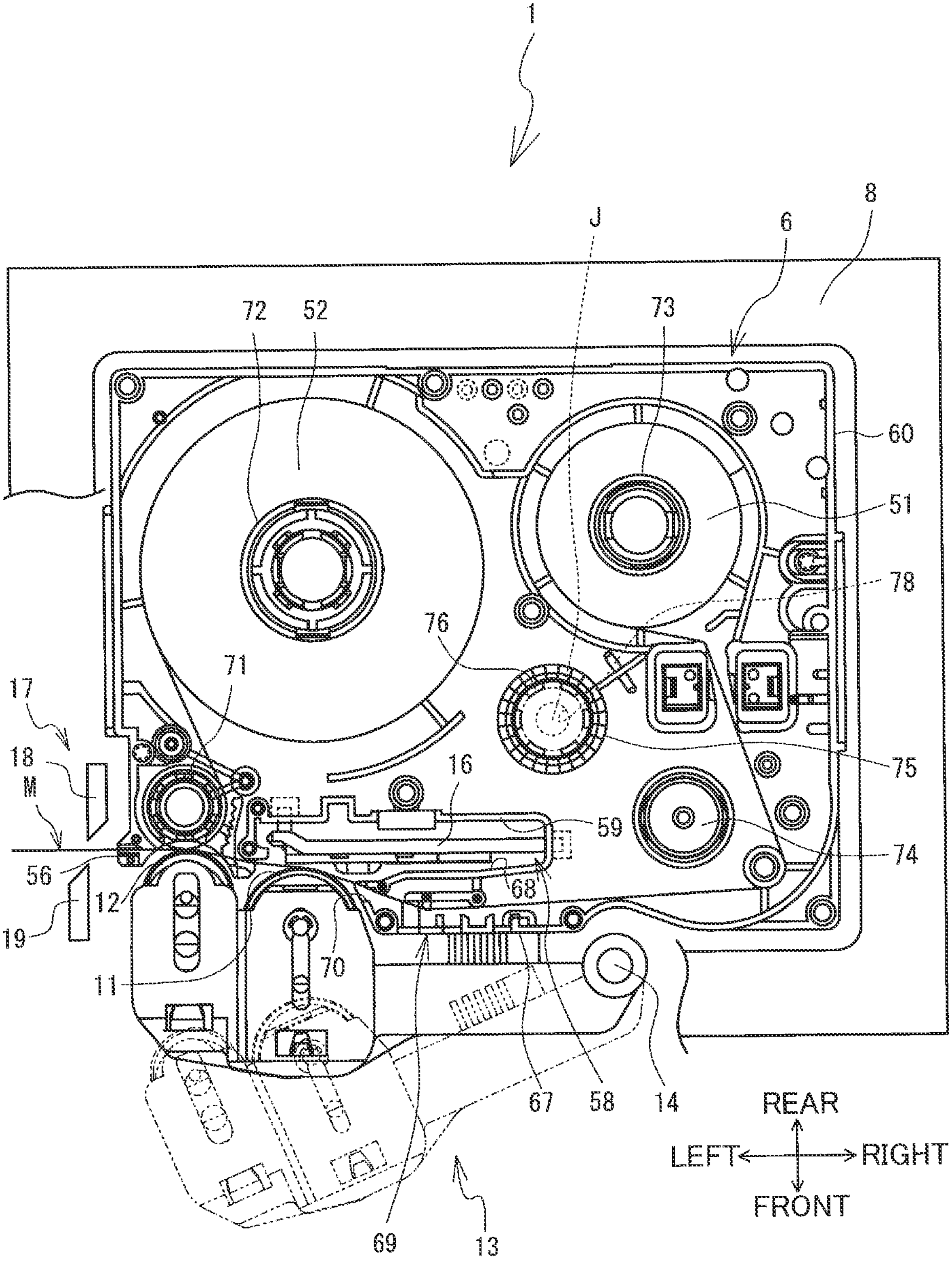
FIG. 6 is a schematic plan view illustrating an internal structure of the cassette 6 that is mounted on the cassette receiving portion 8.

The spool 75 is rotatably supported by the support portion 65 extending throughout the thickness of the casing 60 in the upward/downward direction. The spool 75 has an inner peripheral surface defining a hollow space of the spool 75, the hollow space being in alignment with an opening 79 formed in a bottom wall of the casing 60 (see FIG. 4). Referring to FIG. 6, the inner peripheral surface of the spool 75 is provided with engagement parts 76 protruding radially inwardly therefrom. The engagement parts 76 extend in the upward/downward direction to at least a region below a center K in the upward/downward direction of the inner peripheral surface of the spool 75 (see FIG. 7). The engagement parts 76 are engageable with the ribs 82 of the movable member 85 which is rotatable (together with the drive shaft 83) by the rotation of the motor 36. Hence, the spool 75 is rotatable in association with the rotation of the movable member 85.

As illustrated in FIG. 6, the heat-sensitive tape 51 is an elongated-shaped printing medium (printing tape).

In a case where the heat-sensitive tape 51 is a printing tape of the color heat-sensitive type, the heat-sensitive tape 51 is constituted by lamination of multiple layers for enabling color printing using a combination of three primary colors of cyan, magenta and yellow.

Specifically, the heat-sensitive tape 51 of the color heat-sensitive type includes, for example, a base layer, a plurality of heat-sensitive layers, a plurality of heat-insulating layers, and an overcoat layer. According to the present embodiment, the plurality of heat-sensitive layers includes a first heat-sensitive layer, a second heat-sensitive layer, and a third heat-sensitive layer. The plurality of heat-insulating layers includes a first heat-insulating layer and a second heat-insulating layer. The base layer, the first heat-sensitive layer, the first heat-insulating layer, the second heat-sensitive layer, the second heat-insulating layer, the third heat-sensitive layer, and the overcoat layer are laminated in the order given in a thickness direction of the heat-sensitive tape 51.

The base layer is a resin film, specifically a non-foamed resin film. Each of the first heat-sensitive layer, the second heat-sensitive layer, and the third heat-sensitive layer is configured to produce a color corresponding to one of the three primary colors (cyan, magenta, and yellow) when heated to a color-developing temperature specific to that layer. The first heat-insulating layer and the second heat-insulating layer are sheet-like layers each made from a material having relatively low thermal conductivity. Each of the heat-insulating layers produces a desired difference in temperature between the neighboring heat-sensitive layers according to the thermal conductivity of each heat-insulating layer. The overcoat layer is positioned opposite to the base layer to protect the plurality of heat-sensitive layers.

In a case where the heat-sensitive tape 51 is a printing tape of the monochromatic heat-sensitive type, the heat-sensitive tape 51 is constituted by lamination of multiple layers for enabling monochromatic printing. Specifically, the heat-sensitive tape 51 includes, for example, a base layer, a heat-sensitive layer, and an overcoat layer. The base layer, heat-sensitive layer, and overcoat layer are laminated in the order given in the thickness direction of the heat-sensitive tape 51.

The heat-sensitive tape 51 of either the color heat-sensitive type or the monochromatic heat-sensitive type is wound over the spool 73 in a roll-like form, and is paid out frontward from a front end of the roll, and is then turned leftward at a front right end portion of the cassette 6. The heat-sensitive tape 51 passes through an interior of the arm portion 69, and is exposed to the outside of the cassette 6 through the ejection opening 70.

Upon attachment of the cassette 6 to the cassette receiving portion 8, in the head opening 58, the base layer of the heat-sensitive tape 51 faces the platen roller 11, and the overcoat layer, which is opposite to the base layer, faces the print head 15. After passing through the head opening 58, the heat-sensitive tape 51 passes through a portion between the tape conveyer roller 71 and the movable conveyer roller 12. At this time, the overcoat layer of the heat-sensitive tape 51 faces the tape conveyer roller 71, while the base layer of the heat-sensitive tape 51 faces the movable conveyer roller 12.

The adhesive tape 52 is an elongated medium, and is constituted by lamination of multiple layers. Specifically, the adhesive tape 52 includes a double-sided adhesive tape, and a release paper. The double-sided adhesive tape includes a white sheet, is configured by applying adhesive agent to each surface of the white sheet.

The adhesive tape 52 is wound over the spool 72 in a roll-like form, and is paid out frontward from a left end of the roll. The adhesive tape 52 is then turned leftward, while making contact with a right front peripheral portion of the tape conveyer roller 71. At this time, the releasable paper of the adhesive tape 52 faces the tape conveyer roller 71, and the double-sided adhesive tape of the adhesive tape 52 faces the movable conveyer roller 12. The heat-sensitive tape 51 is superposed with the adhesive tape 52 such that the overcoat layer contacts the adhesive tape 52.

Further, in the case where the cassette 6 accommodates the heat-sensitive tape 51 of the color heat-sensitive type, the cassette 6 also includes the pressure portion 78.

The pressure portion 78 is a cylindrical protruding portion protruding, from the inner peripheral surface of the spool 75, radially inward toward a center axis J of the spool 75 (see FIG. 6). The pressure portion 78 is positioned above the center K in the upward/downward direction of the inner peripheral surface of the spool 75 (see FIG. 7). That is, the pressure portion 78 is positioned closer to an upper wall of the casing 60 than to the bottom wall of the casing 60 in the upward/downward direction. The pressure portion 78 has a protruding length greater than a protruding length of the engagement parts 76 on the inner peripheral surface of the spool 75, as illustrated in FIG. 6. The pressure portion 78 has a protruding end that is positioned closer to the center axis J than any other portion provided on the inner peripheral surface of the spool 75. The pressure portion 78 may be or may not be integrally formed with the spool 75.

The pressure portion 78 is configured to contact the first gear 28 indirectly (via the movable member 85) upon attachment of the cassette 6 (casing 60) to the cassette receiving portion 8. In the present embodiment, the pressure portion 78 is configured to contact the movable member 85 from above to push the same downward upon attachment of the cassette 6 to the cassette receiving portion 8, thereby moving the first gear 28 downward from the first position to the second position. Hence, the ratio of the rotation number of the platen roller 11 to the rotation number of the motor 36 is switched upon transmission of the driving force of the motor 36 to the platen roller 11.

<Attachment and Detachment of Cassette 6 Relative to Cassette Receiving Portion 8>

Next, attachment of the cassette 6 including the pressure portion 78 to the cassette receiving portion 8 and attachment of the cassette 6 without the pressure portion 78 to the cassette receiving portion 8 will be respectively described with reference to FIGS. 1A, 1B, 5, 7, and 8. The cassette 6 with the pressure portion 78 includes the heat-sensitive tape 51 of color heat-sensitive type, whereas the cassette 6 without the pressure portion 78 includes the heat-sensitive tape 51 of monochromatic heat-sensitive type, as described above.

Figure 5:
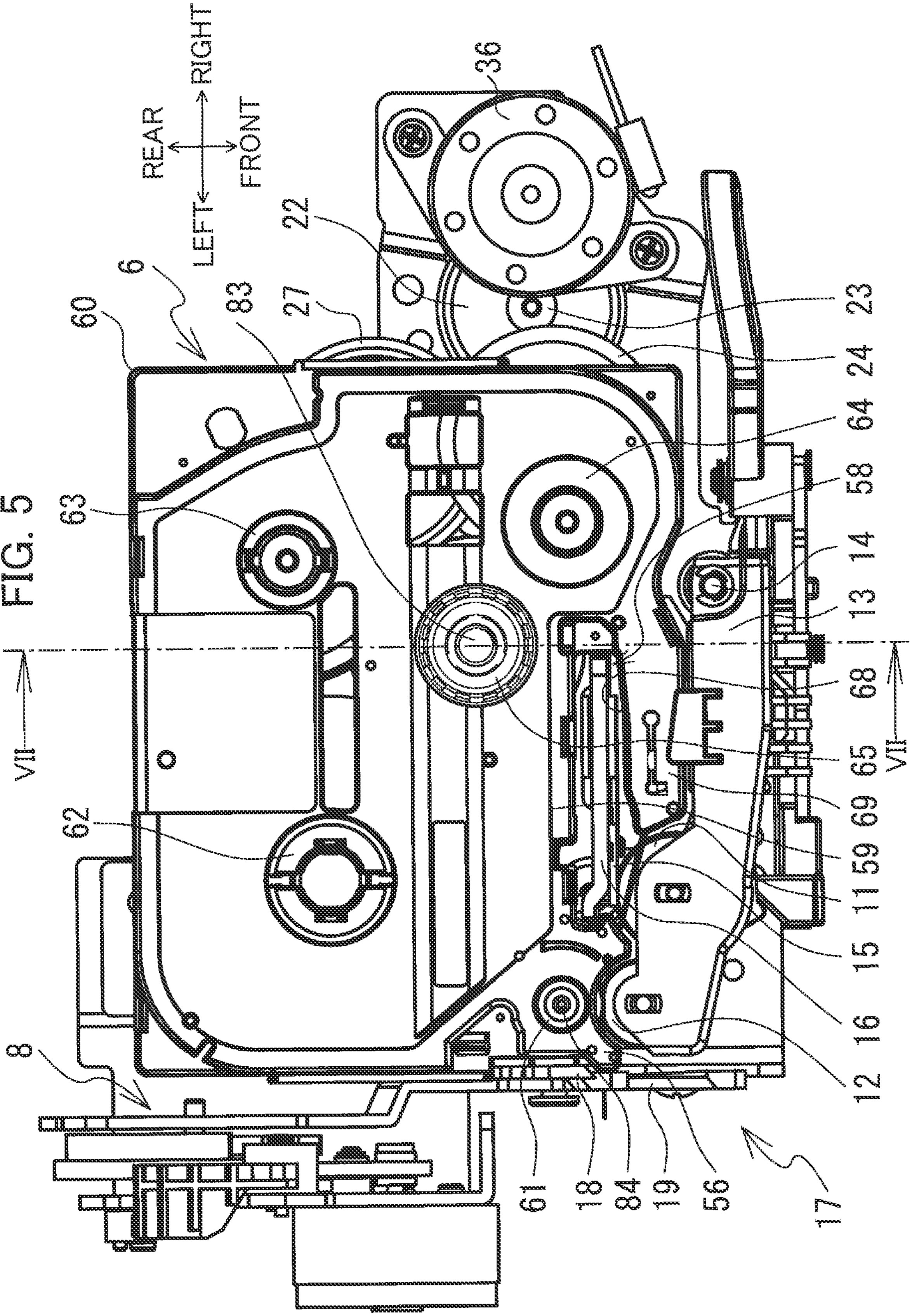
FIG. 5 is a plan view illustrating the cassette receiving portion 8 on which the cassette 6 is mounted, in which delineation of the bottom surface of the cassette receiving portion 8 is omitted.

As illustrated in FIG. 1B, for attaching the cassette 6 (with and without the pressure portion 78) to the cassette receiving portion 8, a user holds the cassette 6 above the cassette receiving portion 8 while the cover 3 remains open relative to the housing 2. The user then moves the cassette 6 downward toward the cassette receiving portion 8. In so doing, as illustrated in FIG. 5, the drive shaft 83 is inserted into the spool 75 of the cassette 6, and the drive shaft 84 is inserted into the tape conveyer roller 71 of the cassette 6, and the head holder 16 is inserted into the head opening 58. The cassette 6 (with and without the pressure portion 78) is thus attached to the cassette receiving portion 8. In the present embedment, the downward direction is an attaching direction of the cassette 6 in the present embodiment. The user than closes the cover 3 relative to the housing 2, as illustrated in FIG. 1A.

As illustrated in FIG. 7, in a case where the cassette 6 including the pressure portion 78 is attached to the cassette receiving portion 8, the drive shaft 83 rotatable by the rotation of the motor 36 is inserted in the spool 75 to extend therethrough. By the downward movement of the cassette 6, the pressure portion 78 pushes the first gear 28 downward through the movable member 85 disposed over the drive shaft 83.

Specifically, the pressure portion 78 has an upper end face 781 and a lower end face 782. The pressure member 88 provided at the lower surface of the cover 3 has a lower end 881 configured to face the upper end face 781 of the pressure portion 78. The lower end 881 of the pressure member 88 is formed with a recess 882 that is recessed upward. The upper end of the drive shaft 83 is configured to abut on the recess 882. The lower end face 782 of the pressure portion 78 is configured to contact the upper end 851 of the movable member 85.

By the insertion of the cassette 6 in the cassette receiving portion 8, the lower end face 782 of the pressure portion 78 is brought into abutment with the upper end 851 of the movable member 85 to push the movable member 85 and the first gear 28 downward against the biasing force of the urging member 89. As a result, the first gear 28 is moved downward from the first position to the second position, so that the first gear 28 is disengaged from the second gear 24 and is brought into meshing engagement with the third gear 27. At this time, the upper end face 781 of the pressure portion 78 is slightly spaced away from the lower end 881 of the pressure member 88. Further, the upper end of the drive shaft 83 abuts on the recess 882 of the pressure member 88, and is pressed downward by the pressure member 88 when the cover 3 is closed. With this structure, even if the attached cassette 6 is lifted upward by the urging force of the urging member 89, the pressure portion 78 is brought into contact with the pressure member 88 so that the attached cassette 6 can be restricted from moving further upward.

For detaching the cassette 6 provided with the pressure portion 78 from the cassette receiving portion 8, the user takes out the cassette 6 by moving the cassette 6 upward (in a cassette detaching direction) while the cover 3 is opened. As the pressure portion 78 separates from the movable member 85 in accordance with the detachment of the cassette 6, the first gear 28 is moved upward from the second position to the first position by the urging force of the urging member 89. Accordingly, the first gear 28 is disengaged from the third gear 27 and is brought into meshing engagement with the second gear 24.

Figure 8:
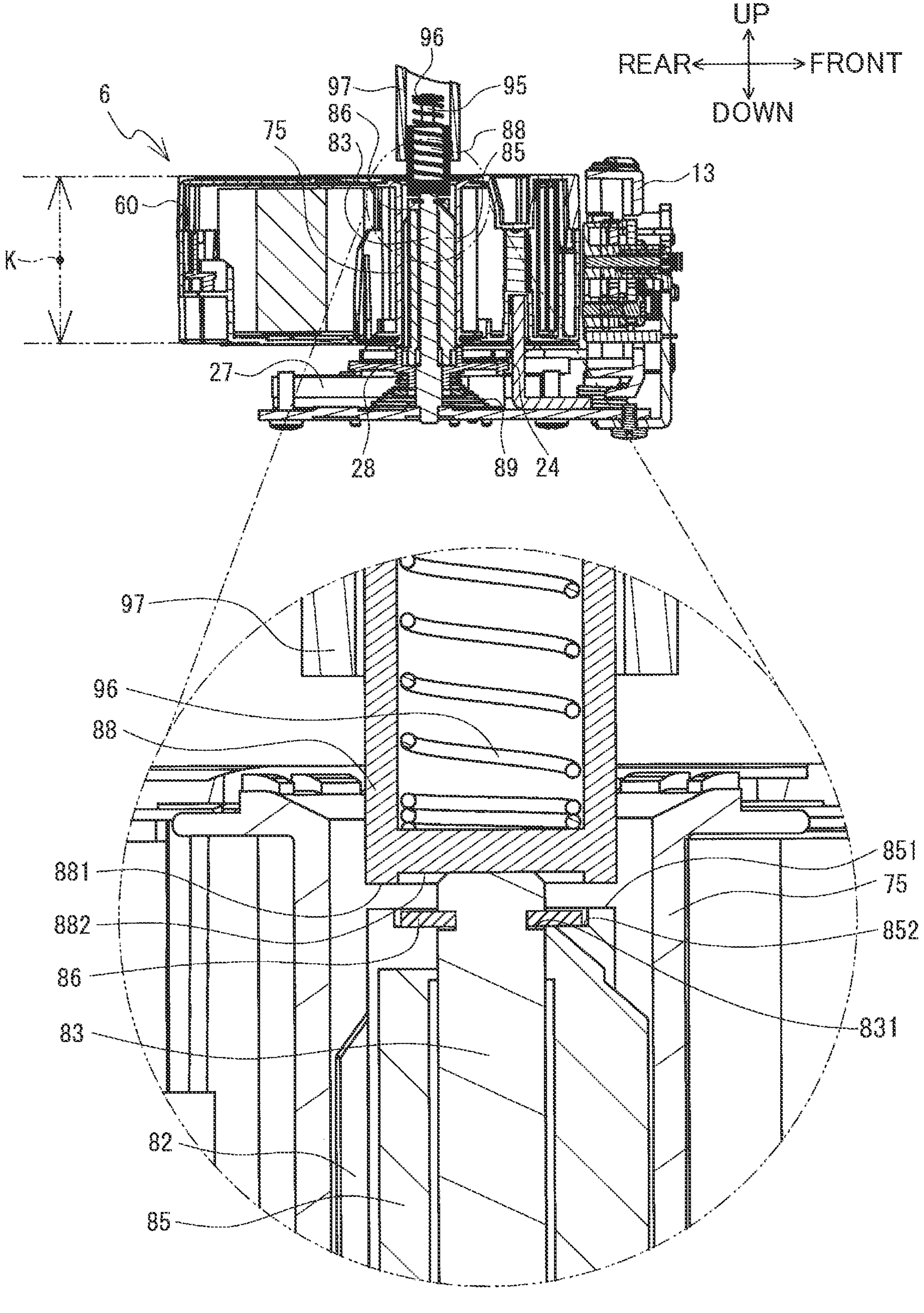
FIG. 8 is a cross-sectional view of the cassette 6 mounted on the cassette receiving portion 8 taken along the line VII-VII of FIG. 5, and particularly illustrating the cassette 6 without the pressure portion 78.

In a case where the cassette 6 without the pressure portion 78 is attached to the cassette receiving portion 8 as illustrated in FIG. 8, the drive shaft 83 is inserted in the hollow space of the spool 75 to extend therethrough.

Specifically, the recessed portion 852 of the movable member 85 abuts on the lower surface of the ring 86 provided at the upper end portion of the drive shaft 83. Due to the abutment of the movable member 85 with the ring 86 of the drive shaft 83, the movable member 85 is restricted from moving further upward by the urging force of the urging member 89. Accordingly, the first gear 28 remains at the first position to engage the second gear 24. Further, the upper end of the drive shaft 83 abuts on the recess 882 of the pressure member 88. With this structure, even if the attached cassette 6 without the pressure portion 78 is lifted upward by the urging force of the urging member 89, the cassette 6 is restricted from being lifted upward due to the urging force of the urging member 89.

For detaching the cassette 6 without the pressure portion 78 from the cassette receiving portion 8, the user takes out the cassette 6 by moving the cassette 6 upward while the cover 3 is opened. At this time, the first gear 28 maintains the first position to maintain meshing engagement with the second gear 24, and is kept disengaged from the third gear 27.

<Printing Operations>

Next, how the printing device 1 performs printing with the cassette 6 (with or without the pressure portion 78) based on print data will be described.

In the printing device 1, the motor 36 is controlled to rotate the tape conveyer roller 71, the movable conveyer roller 12, and the platen roller 11. Upon attachment of the cassette 6 to the cassette receiving portion 8, the heat-sensitive tape 51 and the adhesive tape 52 are paid out respectively by the co-operation of the tape conveyer roller 71, the movable conveyer roller 12, and the platen roller 11. In accordance with the rotation of the motor 36, the drive shaft 83 is rotated, thereby rotating the spool 75.

The print head 15 is also controlled while the motor 36 is controlled. Specifically, the plurality of the heat generating elements of the print head 15 is selectively heated based on the print data, while the heat-sensitive tape 51 is being conveyed. At this time, the heat-sensitive tape 51 is heated by the print head 15 from the overcoat layer side, the overcoat layer being positioned opposite to the base layer in the thickness direction of the heat-sensitive tape 51. An image based on the image data is thus formed (printed) on the heat-sensitive tape 51. The printed heat-sensitive tape 51 and the adhesive tape 52 are then conveyed by the rotation of the drive shaft 84 (tape conveyer roller 71) caused by the rotation of the motor 36.

A conveying speed of the heat-sensitive tape 51 and the adhesive tape 52 by the rotation of the movable conveyer roller 12 is switched in response to the change in the position in the upward/downward direction of the first gear 28. In the present embodiment, the conveying speed is set at a first conveying speed in a case where the cassette 6 including the monochromatic heat-sensitive tape 51 (without the pressure portion 78) is attached to the cassette receiving portion 8 and the first gear 28 is at the first position, whereas the conveying speed is set at a second conveying speed lower than the first conveying speed in a case where the cassette 6 including the color heat-sensitive tape 51 (including the pressure portion 78) is attached to the cassette receiving portion 8 and the first gear 28 is at the second position.

With this configuration, in the printing device 1, the heat-sensitive tape 51 can be conveyed more slowly and accurately during color printing (using the color heat-sensitive tape 51) than during monochromatic printing (using the monochromatic heat-sensitive tape 51), in order to secure a timeslot for heat transmission to each of the heat-sensitive layers corresponding to the three primary colors.

The printed heat-sensitive tape 51 and the adhesive tape 52 are bonded to each other to create the tape M, while being nipped between the movable conveyer roller 12 and the tape conveyer roller 71 with the printed heat-sensitive tape 51 superposed with the adhesive tape 52. As illustrated in FIG. 6, the tape M is then conveyed, through the guide portion 56, to be discharged out of the cassette 6 (casing 60). The tape M is subsequently conveyed to the cutter mechanism 17 and is cut by the cutter mechanism 17. The cut tape M is discharged to the outside of the printing device 1 through the ejection slit 10.

2. Second Embodiment

Figure 9:
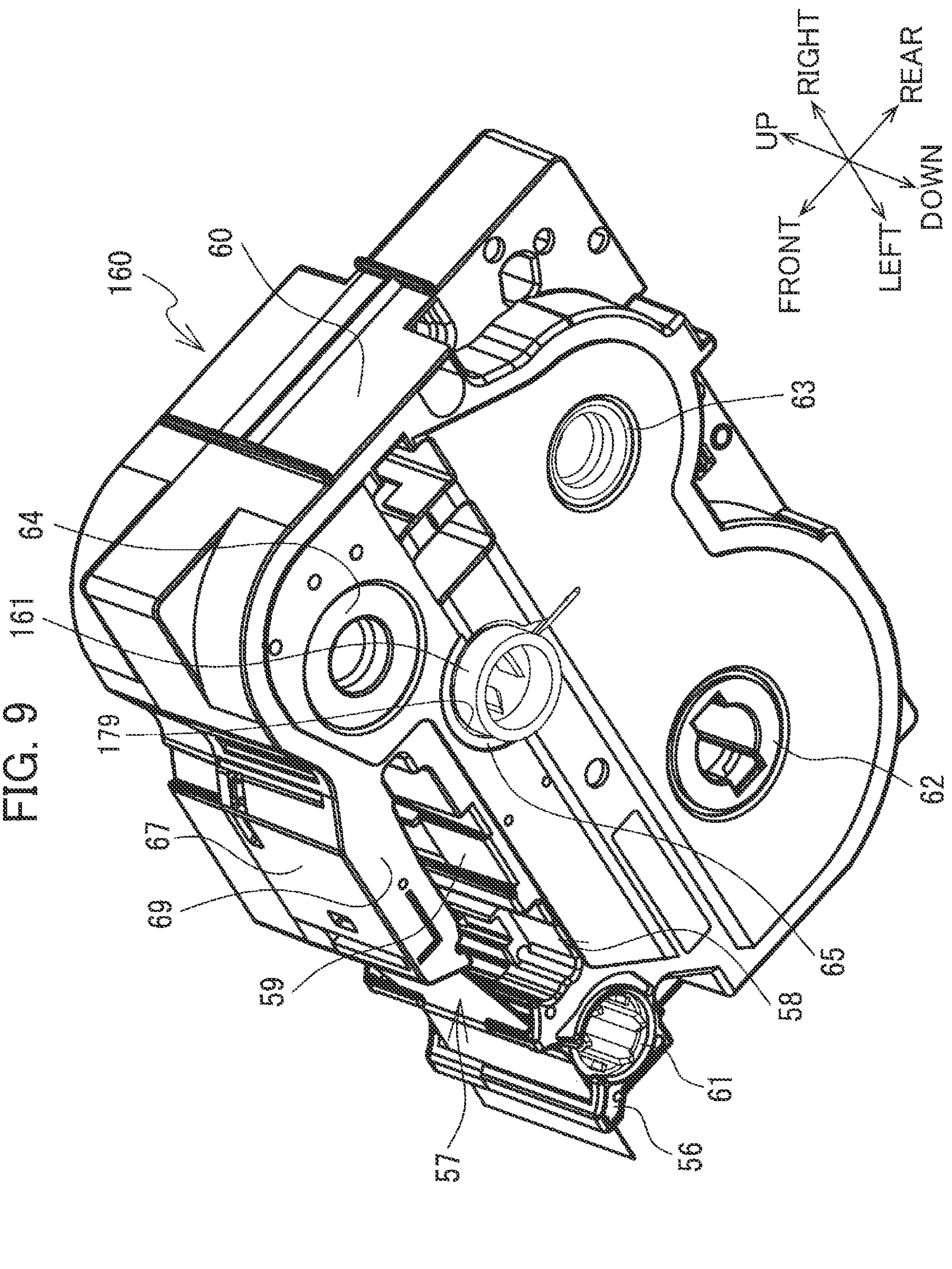
FIG. 9 is a perspective view of a cassette 160 according to a second embodiment.
Figure 10:
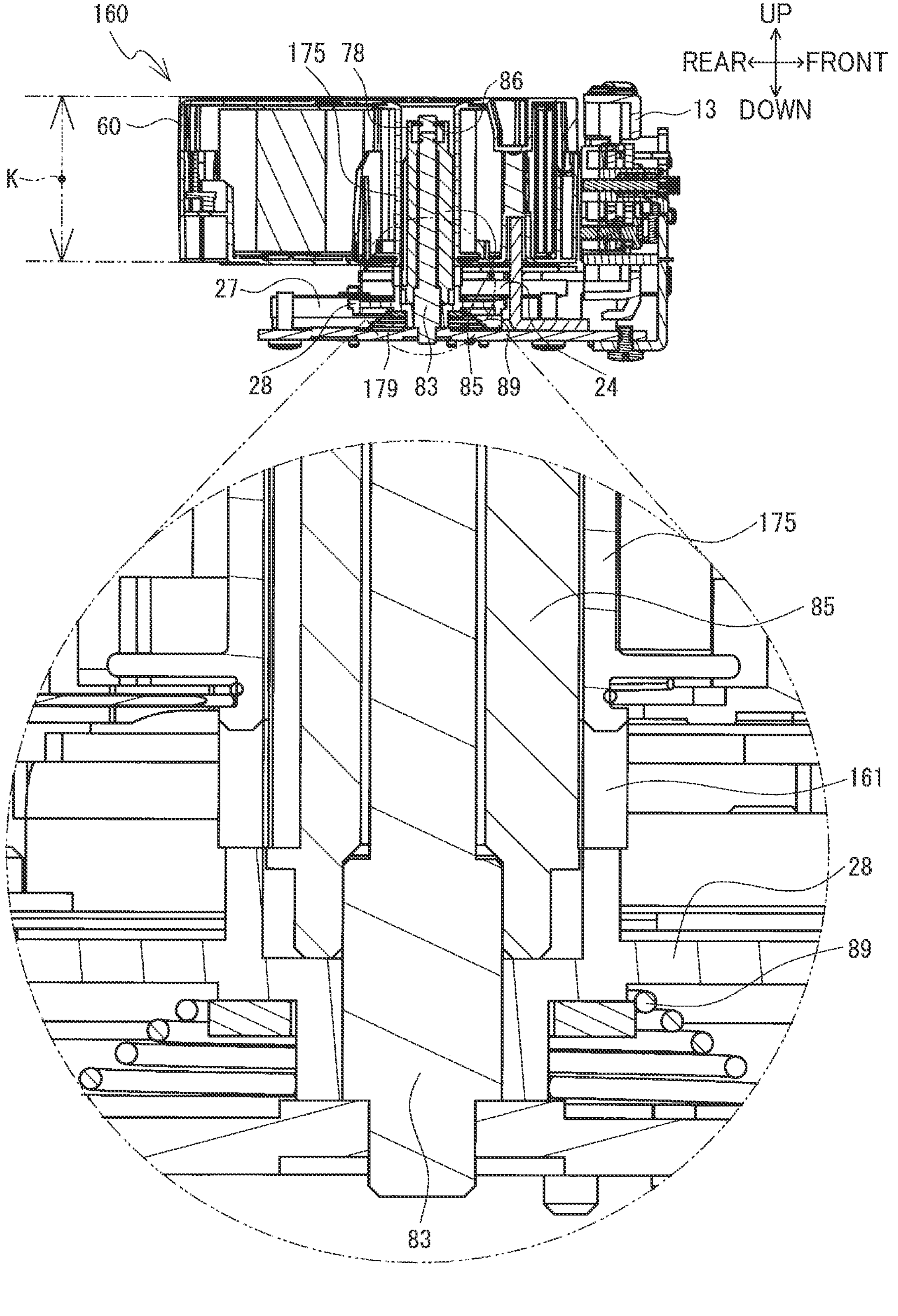
FIG. 10 is a cross-sectional view of the cassette receiving portion 8 and the cassette 160 mounted thereon taken along a line corresponding to the line VII-VII of FIG. 5.

Next, a cassette 160 according to a second embodiment will be described next with reference to FIGS. 9 and 10. In the second embodiment, the first gear 28 is directly moved downward through a pressure portion 161 provided on a lower surface of the cassette 160. In FIGS. 9 and 10, like parts and components are designated by the same reference numerals as those shown in FIGS. 1 through 8.

The second embodiment is the same as the first embodiment except that: the cassette 160 according to the second embodiment includes the pressure portion 161, instead of the pressure portion 78 provided on the inner peripheral surface of the spool 75 of the cassette 6; and a spool 175 of the cassette 160 is positioned above the pressure portion 161 such that a hollow space of the spool 175 is in alignment with an opening 179 formed in the bottom wall of the casing 60.

The pressure portion 161 is hollow cylindrical in shape and extends downward from a lower surface of the bottom wall of the casing 60 of the cassette 160. Although not illustrated, the bottom wall of the cassette receiving portion 8 is formed with a through-hole having a circular shape in a plan view. In the attached state of the cassette 160 to the cassette receiving portion 8, the drive shaft 83, the movable member 85 disposed over the drive shaft 83, and the pressure portion 161 disposed over the movable member 85 can extend through the through-hole.

As illustrated in FIG. 10, in the attached state of the cassette 160 to the cassette receiving portion 8, the lower end of the pressure portion 161 abuts on an upper end of the first gear 28 to move the first gear 28 downward against the urging force of the urging member 89. Hence, the first gear 28 is moved from the first position to the second position. The first gear 28 is thus disengaged from the second gear 24, and comes into meshing engagement with the third gear 27.

Although not illustrated, the upper end of the drive shaft 83 may be in abutment with the recess 882 (FIG. 8) recessed upward from the lower end 881 of the pressure member 88, so that the drive shaft 83 is urged downward by the pressure member 88 of the closed cover 3 to prevent the cassette 160 from moving upward due to the urging force of the urging member 89.

In accordance with detachment of the cassette 160 from the cassette receiving portion 8, the lower end of the pressure portion 161 is separated away from the upper end of the first gear 28. Hence, the first gear 28 is moved upward from the second position to the first position by the urging force of the urging member 89. The first gear 28 is thus disengaged from the third gear 27 and comes into meshing engagement with the second gear 24.

In the second embodiment, the cassette 160 provided with the pressure portion 161 (i.e., incorporating the color heat-sensitive tape 51), and a cassette without the pressure portion 161 (i.e., the cassette 6 incorporating the monochromatic heat-sensitive tape 51 of the first embodiment) can be selectively attachable to the cassette receiving portion 8. In the power transmission from the motor 36 to the platen roller 11, the ratio of the rotation number of the platen roller 11 to the rotation number of the motor 36 is switchable between a state where the cassette 6 without the pressure portion 161 is attached to the cassette receiving portion 8 (so that the first gear 28 is maintained at the first position) and a state where the cassette 160 including the pressure portion 161 is attached to the cassette receiving portion 8 (so that the first gear 28 is moved to the second position). In the second embodiment, the movable member 85 may be immovable in the upward/downward direction with respect to the drive shaft 83.

3. Technical Advantages of the First and Second Embodiments

The cassette 6 according to the first embodiment includes the heat-sensitive tape 51 as the printing medium, the casing 60 accommodating therein the heat-sensitive tape 51, and the pressure portion 78 (if the heat-sensitive tape 51 is of the color heat-sensitive type). The casing 60 of the cassette 6 is detachably attached to the cassette receiving portion 8 of the printing device 1 that also includes: the print head 15 configured to print an image on the heat-sensitive tape 51; the motor 36 configured to drive the platen roller 11 for conveying the heat-sensitive tape 51; and the power transmission portion 20. The power transmission portion 20 includes the plurality of gears 21 through 35 including the first gear 28, and is configured to switch the ratio of the rotation number of the platen roller 11 to the rotation number of the motor 36 depending on the position in the upward/downward direction of the first gear 28.

Upon attachment of the cassette 6 (incorporating the color heat-sensitive tape 51) the cassette receiving portion 8 of the printing device 1, the pressure portion 78 abuts on the movable member 85 to move the first gear 28 downward, i.e., in the attaching direction of the cassette 6 (casing 60) to the cassette receiving portion 8. Thus, the pressure portion 78 can permit the power transmission portion 20 of the printing device 1 to switch the rotation ratio in the power transmission from the motor 36 to the platen roller 11.

As such, there is no need to perform the origin confirmation of the motor 36 in the printing device 1 when the rotation speed of the platen roller 11 is switched. Accordingly, the cassette 6 according to the first embodiment can shorten a time period required before the printing device 1 starts printing when the switching of the rotation speed of the platen roller 11 is performed in the printing device 1 to which the cassette 6 is attached.

The cassette 160 according to the second embodiment (incorporating the color heat-sensitive tape 51) includes the pressure portion 161, instead of the pressure portion 78. The cassette 160 according to the second embodiment can exhibit similar advantageous effects to the cassette 6 of the first embodiment.

The cassette 6 according to the first embodiment includes the spool 75 whose hollow space is in alignment with the opening 79 formed in the bottom wall of the casing 60. The pressure portion 78 protrudes from the inner peripheral surface of the spool 75 toward the center axis J of the spool 75. In the state where the casing 60 (cassette 6) is detachably attached to the cassette receiving portion 8 of the printing device 1, the drive shaft 83 is inserted in the hollow space of the spool 75 to extend therethrough. The drive shaft 83 is positioned in the cassette receiving portion 8 and is configured to be rotated by the rotation of the motor 36.

The pressure portion 78 pushes the first gear 28 downward through the movable member 85 which is disposed over the drive shaft 83 so as to be movable in the upward/downward direction relative to the drive shaft 83. With this structure, the power transmission portion 20 can switch the rotation ratio of the platen roller 11 to the motor 36 in the power transmission from the motor 36 to the platen roller 11. Since the pressure portion 78 is provided on the inner peripheral surface of the spool 75 of the cassette 6, the pressure portion 78 can more reliably abut on the movable member 85 of the printing device 1, in comparison with an imaginary cassette where the pressure portion 78 is not provided on the inner peripheral surface of the spool 75.

The pressure portion 78 of the cassette 6 according to the first embodiment is positioned above the center K in the upward/downward direction on the inner peripheral surface of the spool 75. In other words, the pressure portion 78 is positioned closer to the upper wall of the casing 60 than to the bottom wall of the casing 60 in the upward/downward direction. This structure can reduce a likelihood that the movable member 85 is moved downward by a member other than the pressure portion 78, in comparison with a conceivable structure where the pressure portion 78 is positioned at or below the center K in the upward/downward direction on the inner peripheral surface.

In the cassette 6 according to the first embodiment, the pressure portion 78 has a protruding end that is positioned closer to the center axis J than any other portion on the inner peripheral surface of the spool 75. Hence, the pressure portion 78 can securely abut on the movable member 85.

The cassette 6 according to the first embodiment includes the engagement parts 76 protruding radially inwardly from the inner peripheral surface of the spool 75. On the inner peripheral surface of the spool 75, the engagement parts 76 extend in the upward/downward direction to occupy at least a region downward of the center K (a region closer to the bottom wall than to the upper wall of the casing 60), while the pressure portion 78 is positioned above the center K in the upward/downward direction of the spool 75. The engagement parts 76 are engageable with the movable member 85 in the circumferential direction of the spool 75. The pressure portion 78 has a protruding end positioned closer to the center axis J of the spool 75 than the protruding ends of the engagement parts 76 are to the center axis J. As the movable member 85 rotates by the rotation of the motor 36, the spool 75 is caused to rotate through the engagement between the movable member 85 (ribs 82) and the engagement parts 76.

In a case where the cassette 6 includes an ink ribbon (i.e., the cassette 6 is either of the receptor type cassette or the laminate type), the ink ribbon can be wound over the spool 75 by the rotation of the spool 75 at a take-up speed corresponding to the rotation speed of the platen roller 11. That is, the spool 75 can be utilized not only in the cassette 6 of the heat-sensitive type (without the ink ribbon), but also in the cassette 6 of the receptor type cassette or the laminate type including the in ribbon. Thus, the cassette 6 can includes the spool 75 as a common part, regardless of the type of the cassette 6.

In the cassette 160 according to the second embodiment, the pressure portion 161 protrudes downward from the lower surface of the casing 60. Upon attachment of the cassette 160 (casing 60) to the cassette receiving portion 8 of the printing device 1, the pressure portion 161 directly contacts the first gear 28 to push the first gear 28 downward, thereby switching the rotation ratio of the platen roller 11 to the motor 36 in the power transmission from the motor 36 to the platen roller 11. In the cassette 160, t the power transmission portion 20 can be made simple.

The cassette 160 according to the second embodiment includes: the hollow-shaped spool 175 whose hollow space is in alignment with the opening 179 formed in the bottom wall of the casing 60; and the pressure portion 161 positioned adjacent to the opening 179. Since the pressure portion 161 is positioned adjacent to the opening 179 in alignment with the hollow space of the spool 175, positioning of the pressure portion 161 relative to the first gear 28 can be easily performed and the pressure portion 161 can be securely abutted on the first gear 28 in comparison with a conceivable structure where the pressure portion 161 is positioned remote from the opening 179. Further, since the pressure portion 161 has the ring shape in a plan view, the pressure portion 161 can securely and uniformly press the first gear 28 downward at a region around the rotation axis of the first gear 28.

The cassette 6, 160 according to the first and second embodiments may include the color heat-sensitive tape 51. Attachment of the cassette 6, 160 to the cassette receiving portion 8 can realize switching of the rotation speed of the platen roller 11 to the motor 36 mechanically. Specifically, the rotation speed of the platen roller 11 relative to the motor 36 for color printing using the cassette 6, 106 incorporating the color heat-sensitive tape 51 attached to the cassette receiving portion 8 can be made different from the rotation speed of the platen roller 11 for printing using a cassette incorporating a tape of a different kind (such as monochromatic heat-sensitive tape 51 other than the color heat-sensitive tape 51) attached to the cassette receiving portion 8.

According to the first and the second embodiments, in the power transmission portion 20, the ration ratio of the platen roller 11 to the motor 36 is set to be lower when the cassette 6, 160 including the color heat-sensitive tape 51 (incorporating the pressure portion 78, 161) is attached to the cassette receiving portion 8 than when the cassette 6 including the monochromatic heat-sensitive tape 51 (without the pressure portion 78, 161) is attached to the cassette receiving portion 8.

With this configuration, in the power transmission portion 20, the color heat-sensitive tape 51 can be conveyed more slowly and accurately than the monochromatic heat-sensitive tape 51, in order to secure a timeslot for heat transmission of each of the heat-sensitive layers corresponding to the three primary colors. Accordingly, improved color printing quality can be realized, compared to a case where color printing is performed at the same printing speed as the monochromatic printing (at the same speed as the monochromatic heat-sensitive tape 51). Further, the cassette 6, 160 according to the first and second embodiments can save user's efforts to manually switch the rotation speed of the platen roller 11 depending on the kind of printing tape accommodated in the casing 60.

4. Modifications and Variations

While the description has been made in detail with reference to the specific embodiments, it would be apparent to those skilled in the art that various changes and modifications may be made therein without departing from the scope of the disclosure.

For example, the platen roller 11 may be provided in the cassette 6, rather than in the printing device 1. Further, the kind of printing tape accommodated in the cassette 6, 160 may be suitably selected.

Further, the cassette 6 may include an ink ribbon, as described above. In this case, the ink ribbon wound over the spool 74 may be pulled outside the casing 60 through the open portion 57 to perform printing on the printing tape, and then, the used ink ribbon may be taken up by the spool 75. Since the spool 75 is rotated by the rotation of the drive shaft 83, the conveying speed of the ink ribbon can be determined by the take-up speed of the ink ribbon.

Among the spools 72 through 75 described above, unused spool(s) may be omitted from the cassette 6 as appropriate. For example, if the cassette 6 does not include an ink ribbon, the spools 74 and 75 may be omitted. Further, if the cassette 6 does not include an ink ribbon, the spool 75 may be omitted, and the support portion 65 may be formed in a hollow cylindrical shape to allow the drive shaft 83 to extend therethrough, and the pressure portion 78 may be provided on an inner peripheral surface of the support portion 65.

The configuration of the pressure portion 78, 161 may be suitably modified. In the first embodiment, the pressure portion 78 has a ring shape in a plan view and is provided on the inner peripheral surface of the spool 75. However, the shape and position of the pressure portion 78 may be suitably modified. For example, the pressure portion 78 may have any shape such as a rectangular shape in a plan view, provided that the pressure portion 78 protrudes radially inward from the inner peripheral surface of the spool 75 toward the center axis J of the spool 75 and is capable of making contact with the movable member 85.

Further, according to the first embodiment, the spool 75 is supported by the support portion 65 extending throughout the casing 60 in the upward/downward direction (in the thickness direction of the cassette 6). However, the support portion 65 may not extend throughout the casing 60 in the upward/downward direction.

The attaching direction of the cassette 6, 160 may be changed depending on the structure of the printing device 1 and the cassette 6, 160, as long as the attaching direction is coincident with the moving direction of the cassette 6,160 for attachment of the cassette 6, 160 to the cassette receiving portion 8. For example, the attaching direction may be coincident with the thickness direction of the cassette 6, i.e., in a direction from the upper surface to the lower surface of the casing 60 and vice versa.

Further, the pressure portion 78 according to the first embodiment may be positioned in a region below the center K or at the center K in the upward/downward direction on the inner peripheral surface of the spool 75. Further, the protruding end of the pressure portion 78 may not be located closest to the center axis J of the spool 75 on the inner peripheral surface of the spool 75.

The pressure portion 161 of the second embodiment may not directly contact the first gear 28, but may move the first gear 28 downward through an intervening component. The shape, position, and size of the pressure portion 161 protruding from one surface (for example, the lower surface) of the cassette 160 may be suitably modified in accordance with the position, size and the like of the gear that is to be moved by the pressure portion 161. For example, instead of the hollow cylindrical shape in a plan view, the pressure portion 161 may be so shaped that a part of the pressure portion 161 is positioned adjacent to the opening 179, or the pressure portion 161 may not be positioned adjacent to the opening 179.

Further, the features of the cassette 6, 160 disclosed in respective embodiments would be combined as appropriate.

REMARKS

The cassette 6, 160 is an example of a cassette. The casing 60 is an example of a casing of the cassette. The heat-sensitive tape 51 is an example of a printing tape. The pressure portion 78, 161 is an example of a pressure portion. The printing device 1 is an example of a printing device. The cassette receiving portion 8 is an example of a cassette receiving portion. The print head 15 is an example of a print head. The platen roller 11 is an example of a platen roller. The motor 36 is an example of a motor. The power transmission portion 20 is an example of a power transmission portion. The first gear 28 is an example of a specific gear. The movable member 85 is an example of a movable member. The spool 75, 175 is an example of a spool. The engagement parts 76 are an example of an engagement part. The opening 79 in the bottom wall of the casing 60 is an example of an opening in a first wall of the casing. The opening 179 is an example of an opening formed in one surface of the casing. The attaching direction of the cassette 6, 160 to the cassette receiving portion 8 is an example of a first direction.

What is claimed is:

1. A cassette comprising:
- a printing tape to be printed;
- a casing accommodating the printing tape, the casing including an upper wall and a bottom wall facing each other in a thickness direction;
- a spool positioned between the upper wall and the bottom wall in the thickness direction, the spool having a hollow cylindrical shape and rotatably supported by the casing, the spool having an inner peripheral surface defining a hollow space in the spool and the hollow space being in alignment with an opening formed in the bottom wall of the casing; and
- a pressure portion provided on the inner peripheral surface of the spool and protruding therefrom toward a center axis of the spool, wherein the pressure portion is positioned closer to the upper wall than to the bottom wall in the thickness direction on the inner peripheral surface, and wherein the pressure portion has a protruding end that is positioned closer to the center axis of the spool than any other portion on the inner peripheral surface.

2. The cassette according to claim 1, wherein the printing tape is a color heat-sensitive tape.

3. A cassette comprising:

a printing tape to be printed;

a casing accommodating the printing tape;

a spool having a hollow cylindrical shape and rotatably supported by the casing such that the spool is rotatable about an axis extending in an axial direction, the spool having an inner peripheral surface defining a hollow space in the spool and the hollow space being in alignment with an opening formed in a bottom surface of the casing; and a pressure portion provided on the bottom surface of the casing at a position in alignment with the opening in the axial direction, the pressure portion protruding downward from the bottom surface of the casing.

4. The cassette according to claim 3, wherein the printing tape is a color heat-sensitive tape.

5. A cassette comprising:

a printing tape to be printed;

a casing accommodating the printing tape;

a spool having a hollow cylindrical shape and rotatably supported by the casing, the spool having an inner peripheral surface defining a hollow space in the spool and the hollow space being in alignment with an opening formed in a bottom surface of the casing; and a pressure portion provided on the bottom surface of the casing at a position in alignment with the opening such that the pressure portion surrounds the opening to expose the hollow space in the spool, the pressure portion protruding downward from the bottom surface of the casing.

6. The cassette according to claim 5, wherein the printing tape is a color heat-sensitive tape.

* * * * *